United States Patent
Iwatsuki et al.

[11] Patent Number: 5,899,194
[45] Date of Patent: May 4, 1999

[54] METHOD AND APPARATUS FOR SUPPLYING FUEL

[75] Inventors: Syuhei Iwatsuki, Nagoya; Eiji Mori; Kouji Matsumura, both of Toyota, all of Japan

[73] Assignee: Toyota Jidosha Kabushiki Kaisha, Toyota, Japan

[21] Appl. No.: 08/977,204

[22] Filed: Nov. 24, 1997

[30] Foreign Application Priority Data

Nov. 25, 1996 [JP] Japan ..................... 8-313702

[51] Int. Cl.⁶ .................................. F02B 43/00
[52] U.S. Cl. .............. 123/527; 123/490; 251/129.21
[58] Field of Search .............. 123/497, 499, 123/527, 479, 490; 137/630.15; 251/129.21, 129.09

[56] References Cited

U.S. PATENT DOCUMENTS

| | | | |
|---|---|---|---|
| 5,085,193 | 2/1992 | Morikawa | 123/458 |
| 5,188,017 | 2/1993 | Grant et al. | 91/459 |
| 5,193,580 | 3/1993 | Wass et al. | 137/613 |
| 5,367,999 | 11/1994 | King et al. | 123/458 |
| 5,452,738 | 9/1995 | Borland et al. | 137/265 |
| 5,542,392 | 8/1996 | Povinger | 123/480 |
| 5,546,911 | 8/1996 | Iwamoto et al. | 123/497 |
| 5,611,316 | 3/1997 | Oshima et al. | 123/494 |
| 5,632,250 | 5/1997 | Kato et al. | 123/490 |
| 5,701,869 | 12/1997 | Richardson et al. | 123/497 |
| 5,754,971 | 5/1998 | Matsumoto et al. | 701/103 |
| 5,758,628 | 6/1998 | Wlada | 123/520 |

FOREIGN PATENT DOCUMENTS

| | | |
|---|---|---|
| 6241341 | 8/1994 | Japan. |
| 893564 | 4/1996 | Japan. |

*Primary Examiner*—Erick R. Solis
*Assistant Examiner*—Hai Huynh
*Attorney, Agent, or Firm*—Kenyon & Kenyon

[57] ABSTRACT

A fuel supply controller includes a passage connecting an engine and a fuel tank. An electromagnetic valve is provided in the passage to open and close the passage in stages. The controller controls the electric current flowing through the electromagnetic valve based on information related to the amount of fuel flowing from the fuel tank to the engine.

20 Claims, 12 Drawing Sheets

METHOD AND APPARATUS FOR SUPPLYING FUEL

BACKGROUND OF THE INVENTION

The present invention relates to an apparatus and method for controlling an electromagnetic valve that opens and closes a fuel passage.

A compressed natural gas (CNG) vehicle uses natural gas as fuel. The fuel gas is mixed with air and burned to obtain power. A CNG vehicle is provided with a fuel tank that is charged with pressurized fuel gas. The fuel is sent to the vehicle engine through a fuel passage. The fuel tank is provided with a valve to open and close the fuel passage. A manual type valve, which has a handle to manually move a valve body and open or close the fuel passage, is often employed in CNG vehicles. However, recently, an electromagnetic type valve, which uses electromagnetic force to open and close the fuel passage, has been widely used. Japanese Unexamined Patent Publication No. 6-241341 describes a typical electromagnetic type valve. In the electromagnetic valve, which includes a valve body for opening and closing the fuel passage, a spring and the gas pressure in the tank urges the valve body in a direction closing the fuel passage. An electromagnetic solenoid moves the valve body in a direction opening the fuel passage when actuated.

In a CNG vehicle that employs the electromagnetic type valve, a predetermined amount of electric current flows through the electromagnetic solenoid when the engine is started. The predetermined amount of current is set at a value that moves the valve body and opens the fuel passage even if the difference between the pressure inside the fuel tank and the pressure outside the fuel tank is high. The actuation of the solenoid moves the valve body against the force of a spring and the gas pressure in the tank. This permits the natural gas in the fuel tank to be supplied to the engine through the fuel passage. The electromagnetic solenoid is de-actuated when the engine is stopped. This causes the force of the spring and the force resulting from the pressure of the natural gas to move the valve body in a direction that closes the fuel passage. A rubber seal, which is attached to the valve body to enhance the sealing of the valve, abuts against a seat of the valve. This closes the fuel passage and stops the supply of natural gas to the engine.

It is required that the electromagnetic valve be provided with a leakage prevention function that prevents the fuel from leaking out into the atmosphere when a fuel passage component is punctured or damaged. To fulfill this requirement, in the prior art, a mechanical leakage prevention valve is provided in the fuel pipe. An example of a prior art leakage prevention valve is shown in FIG. 14. The prior art leakage prevention valve is attached to the upstream end of an electromagnetic type valve (not shown). The leakage prevention valve includes a case 100, a valve body 101, and a compression spring 102. The case 100 has a plurality of apertures 100a that permit fuel to enter the case 100 from the tank (not shown) and to enter the tank through the case 100 when fuel is charged from a fuel fill line (not shown). The valve body 101 has a plurality of communication holes 101a and an outlet sleeve 101b. The compression spring 102 urges the valve body 101 in a direction that opens the communication holes 101a. In this state, the fuel tank is constantly communicated with a fuel passage (conduit 26) through the communication holes 101a, the apertures 100a, and the outlet sleeve 101b.

The action of the valve body 101 differs when the fuel passage is in a normal state (no damage to the fuel passage component) and when the fuel passage is in an abnormal state (damage existing). In the normal state, the valve body 101 opens the communication holes 101a. In the abnormal state, the flow rate of the fuel increases. Thus, the difference between the pressure in the fuel tank and the pressure in the fuel passage (conduit 26) increases. The pressure difference closes the communication holes 101a by causing the valve body 101 to enter the conduit 26. However, the urging force of the spring 102 is strong enough to keep the communication holes 101a opened during the normal state, even if the pressure difference or the flow rate of the fuel reaches a level that is a maximum for the normal state. In the abnormal state, the pressure difference increases beyond the maximum pressure difference for the normal state. The urging force of the spring 102 is not strong enough to keep the communication holes 101a opened when the pressure difference reaches such a high value. As a result, the communication holes 101a are closed.

In the prior art electromagnetic valve, to positively move the valve body to a position that opens the fuel passage and to maintain the valve body at that position, even when the pressure difference between the fuel tank and the fuel passage is high, a large relatively high current must flow through the electromagnetic valve. In other words, a relatively high current must flow through the electromagnetic valve regardless of the actual pressure difference. As a result, if the pressure difference is smaller than the maximum value (which is usually the cases), an unnecessary amount of current flows through the electromagnetic valve and consumes electric power in a wasteful manner. In addition, the actuation of the electromagnetic solenoid generates a large amount of heat. The heat raises the temperature of the components arranged about the valve body. Thus, the rubber seal is heated to a high temperature. This may deteriorate the rubber seal and degrade the durability of the seal.

Furthermore, when employing the prior art mechanical leakage prevention valve, the prevention valve must be installed on the electromagnetic valve for complete leakage prevention of the fuel passage. This results in a fuel supply system having a complicated structure. In addition, the prevention valve uses a spring provided with a relatively strong urging force. Thus, the valve body does not close the fuel passage unless the pressure difference becomes very high. In other words, the valve body does not move immediately unless the leakage and the pressure difference becomes very high. Additionally, when servicing the fuel passage or other parts in the fuel supply system, the pressure in the pipe is lowered to atmospheric pressure. Thus, servicing may lead to erroneous functioning of the leakage prevention valve.

SUMMARY OF THE INVENTION

Accordingly, it is a first objective of the present invention to prevent an unnecessary amount of current from flowing though the electromagnetic valve. It is a second objective of the present invention to prevent leakage of fuel without using a mechanical type leakage prevention valve.

To achieve the above objectives, the present invention provides a fuel supply apparatus for supplying a fuel from a fuel container to a destination. The apparatus includes a passage extending between the destination and the fuel container. An electromagnetic valve selectively closes and opens the passage. The valve opens the passage when an electric current is supplied to the valve. A controller controls the flow of electric current to the valve. The controller receives information indicative of the amount of fuel exiting from the fuel container when controlling the current flow to the valve.

In a further aspect of the present invention, a method of controlling a fuel supply apparatus is provided. The method includes the steps of selectively opening and closing a fuel passage with an electromagnetic valve, sensing information relating to the amount of fuel exiting from a fuel container, and controlling an electric current flow to the valve using the sensed-information to regulate the flow of fuel exiting from the fuel container.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of the present invention that is applied to a CNG vehicle will now be described with reference to FIGS. 1 to 8.

Figure 1:
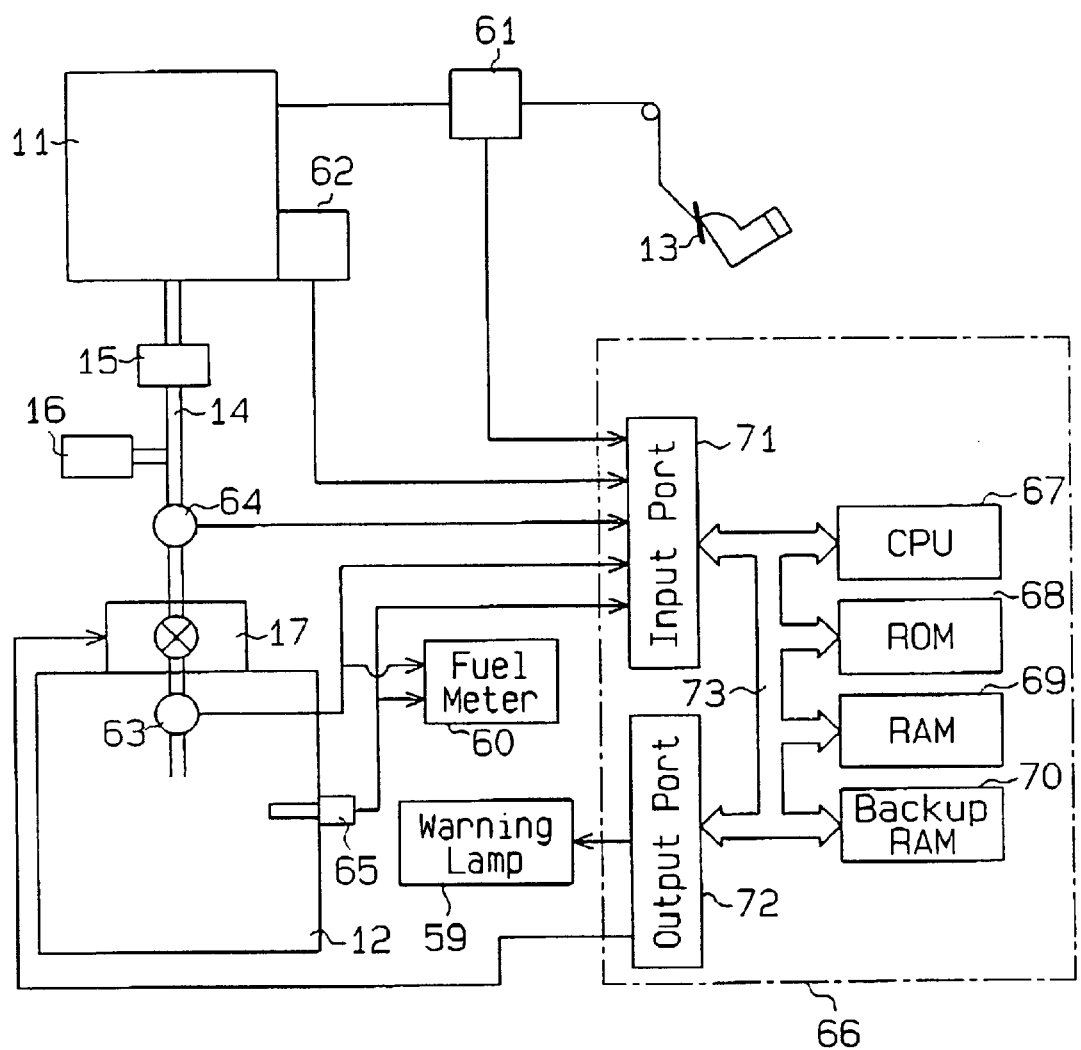
FIG. 1 is a block diagram showing a fuel supply controller according to a first embodiment of the present invention.

As shown in FIG. 1, a CNG vehicle is provided with an engine 11, which uses natural gas as fuel, and a fuel tank 12, which is charged with natural gas. The engine 11 has combustion chambers that are connected to an intake passage. The air flowing through the intake passage is mixed with the fuel sent from the fuel tank 12 and drawn into each combustion chamber. A throttle valve is linked to an acceleration pedal 13 by a cable or the like. The throttle valve is manipulated in accordance with the depression of the acceleration pedal 13. This adjusts the cross-sectional area of the intake passage.

The fuel tank 12 is made of a strong material such as steel or fiber reinforced plastic (FRP). The fuel tank 12 is charged with fuel compressed to a high pressure of about 200 kgf/cm$^2$. A metal fuel tube 14 connects the fuel tank 12 to the engine 11 to convey the fuel from the tank 12 to the engine 11. A pressure regulator 15 is provided in the fuel tube 14. The pressure regulator 15 opens intermittently in accordance with decreases in the fuel pressure downstream of the regulator 15 as the fuel delivered to the engine 11 is burned. A coupling 16 is provided in the fuel passage 14. When charging the fuel tank 12 with fuel, a charging apparatus (not shown) is connected to the coupling 16 with the pressure regulator 15 in a closed state. The charging apparatus then charges pressurized fuel into the fuel tube 14 through the coupling 16. There are two ways to charge fuel with the charging apparatus. One way is to rapidly charge the fuel tank 12 with fuel that has already been pressurized to a high pressure. In this case, fuel that is maintained at a relatively high pressure of 250 kg/fcm$^2$ is stored in a main tank. This fuel is rapidly charged into the fuel tank 12. Another way is to charge the fuel tank 12 with fuel in a gradual manner while pressurizing the fuel with a compact compressor.

Figure 2:
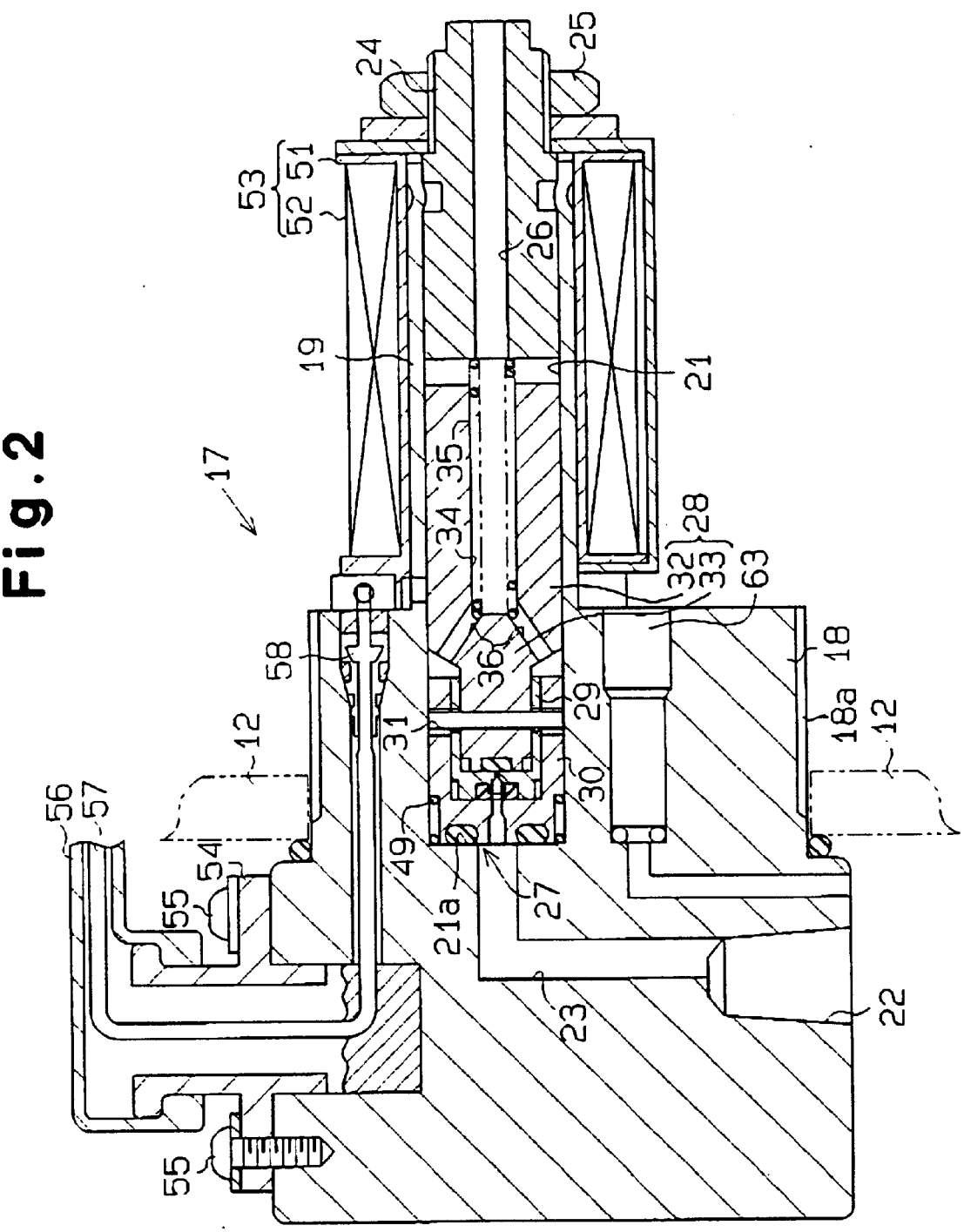
FIG. 2 is a cross-sectional view showing a flow amount control valve.

A multiple step flow amount control valve 17, which is an electromagnetic valve, is incorporated in the fuel tank 12 to open and close the fuel tube 14. As shown in FIG. 2, the control valve 17 has a housing 18. A threaded portion 18a is provided on the housing 18 to screw the housing 18 into the fuel tank 12. A guide 19 projects from the housing 18 into the interior of the fuel tank 12 (toward the right in FIG. 2). The housing 18 includes a central bore 21 that extends axially through the guide 19. The inner end surface 21a of the central bore 21 defines a valve seat. The housing 18 further includes a port 22 and an L-passage 23 that connect the central bore 21 to the fuel tube 14.

Figure 3:
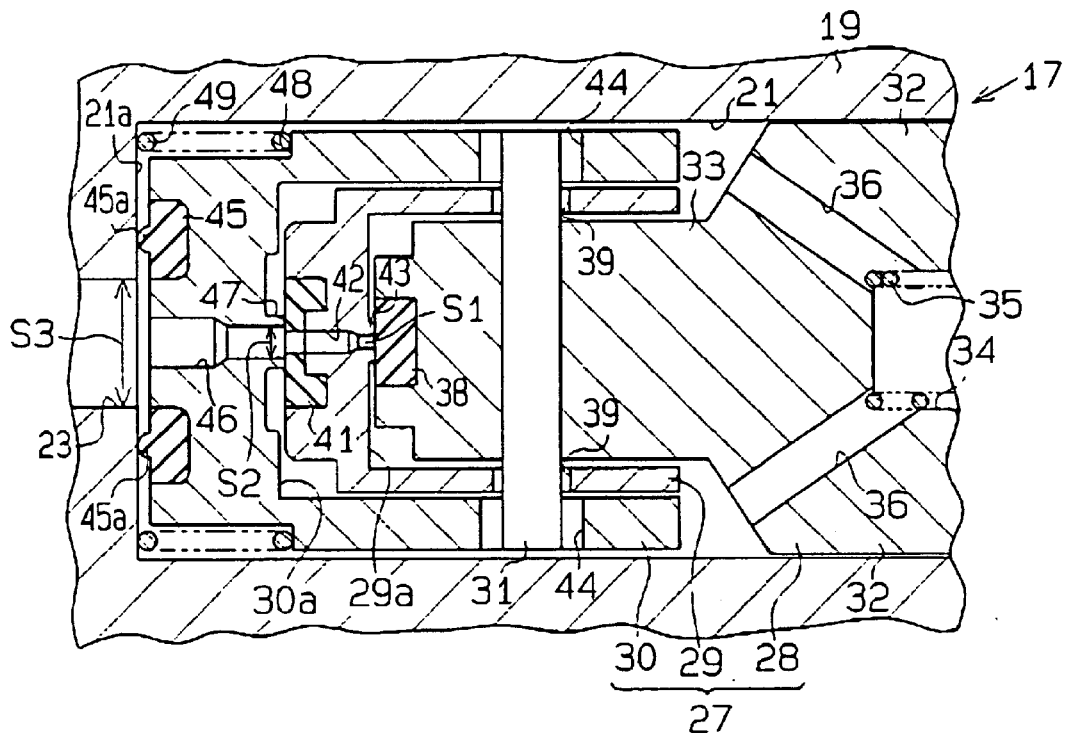
FIG. 3 is a partial enlarged cross-sectional view showing the flow amount control valve in a completely closed is state.

A stator 24 is fitted into the distal portion of the guide 19. The stator 24 is fastened to the guide 19 by a nut 25. A conduit 26 extends axially through the center of the stator 24 and constitutes the fuel passage in the guide 19. A valve body 27 is retained in the central bore 21 so that it may move axially. As shown in FIG. 3, the valve body 27 includes a pilot valve 28, a center valve 29, and a main valve 30. A connecting pin, or coupling pin 31, couples the three valves 28–30 to one another and enables the total length of the three coupled valves 28–30 to vary.

The pilot valve 28, which serves as a first valve member, has cylindrical large and small diameter portions 32, 33 having different diameters. The large diameter portion 32 is provided with a spring bore 34. A coil spring 35, which serves as an urging member, is arranged in the spring bore 34 in a compressed state. The coil spring 35 and the gas pressure in the tank 12 constantly urges the pilot valve 28 away from the stator 24 and in a direction that closes the L-passage 23. A plurality of diagonal passages 36 are provided in the large diameter portion 32 to communicate the space about the small diameter portion 33 with the spring bore 34. The coupling pin 31 is radially pressed into the small diameter portion 33. A rubber seal 38 is fitted to the center of the end wall of the small diameter portion 33.

The center valve 29, which serves as a second valve member, is cup-like and is fitted on the small diameter portion 33. A pair of aligned pin holes 39 extend through the peripheral wall of the center valve 29. The ends of the coupling pin 31, which project radially from the small diameter portion 33 are inserted into the pin holes 39. The diameters of the pin holes 39 are slightly greater than that of the coupling pin 31. Thus, after the pilot valve 28 moves toward the interior of the fuel tank 12 against the urging force of the coil spring 35 and the gas pressure in the tank 12 by a predetermined distance, the center valve 29 starts to follow the pilot valve 28. In other words, the difference between the diameters of the pin holes 39 and the coupling pin 31 delays the movement of the center valve 29 from the movement of the pilot valve 28 and the coupling pin 31. The coupling pin 31 and the pin holes 39 enable relative movement between the center valve 29 and the pilot valve 28.

A rubber seal 41 is fitted to the center of the end wall of the center valve 29. A first orifice 42 extends through the end wall and the rubber seal 41. The inner end surface 29a of the center valve 29 projects toward the pilot valve 28 around the first orifice 42 to define a valve seat 43. Reference character S1 denotes the cross-sectional area of the opening of the first orifice 42 at the valve seat 43. (In FIG. 3, the lead line for reference character S1 does not precisely indicate the location of this area.) Contact between the rubber seal 38 and the valve seat 43 closes the first orifice 42. Separation of the rubber seal 38 from the valve seat 43 opens the first orifice 42.

The main valve 30, which serves as a third valve member, is cup-like and is fitted on the center valve 29. A pair of aligned pin holes 44 extend through the peripheral wall of the main valve 30. The ends of the coupling pin 31, which project radially from the center valve 29 is inserted into the pin holes 44. The diameter of the pin holes 44 are slightly greater than that of the pin holes 39. Thus, after the center valve 29 moves toward the interior of the fuel tank 12 following the movement of the pilot valve 28, the main valve 30 starts to move in the same direction. In other words, the difference between the diameters of the pin holes 44 and 39 delays the movement of the main valve 30 from the movement of the center valve 29. Thus, the coupling pin 31 and the pin holes 44 enable relative movement between the main valve 30, the center valve 29, and the pilot valve 28.

A rubber seal 45 having an annular seal lip 45a is fitted to the end wall of the main valve 30. A second orifice 46 extends through the end wall. The inner end surface 30a of the main valve 30 projects toward the center valve 29 around the first orifice 42 to define a valve seat 47. Reference character 52 denotes the cross-sectional area of the second orifice 46 at the valve seat 47. Reference character S3 denotes the cross-sectional area of the L-passage 23 at the inner end surface 21a of the central bore 21. Cross-sectional area S2 is larger than cross-sectional area S1 but smaller than cross-sectional area S3. Contact between the rubber seal 41 and the valve seat 47 closes the second orifice 47. Separation of the rubber seal 41 from the valve seat 47 opens the second orifice 46.

A stepped portion 48 is provided in the peripheral surface of the main valve 30. A coil spring 49 is arranged in a compressed state between the stepped portion 48 and the inner end surface 21a of the central bore 21. The coil spring 49 constantly urges the main valve 30 in a direction that moves the seal lip 45a away from the inner end surface 21a.

The interior of the fuel tube 14, the central bore 21, the port 22, the L-passage 23, the conduit 26, the spring bore 34, the diagonal passages 36, and the orifices 42, 46 constitute a fuel passage.

As shown in FIG. 2, an electromagnetic solenoid 53, which is formed by winding a coil 52 about a cylindrical bobbin 51, is fitted on the guide 19. When electric current flows through and actuates the electromagnetic solenoid 53, electromagnetic force pulls the pilot valve 28 toward the stator 24 against the force of the spring 35 and the gas pressure in the tank 12 and opens the fuel passage. A holder 54 is fastened to the housing 18 by screws 55. The holder 54 is covered by a boot 56. A harness 57 extends through the holder 54 and the boot 56. One end of the harness 57 is connected to the coil 52 of the electromagnetic solenoid 53 through a terminal 58.

In the above flow amount control valve 17, when electric current does not flow through the coil 52 of the electromagnetic solenoid 53 (that is, when the solenoid 53 is de-actuated), the fuel pressure in the fuel tank 12 and the force of the coil spring 35 act on the valve body 27 in a direction that closes the fuel passage, as shown in the state of FIG. 3. The force of the coil spring 49 also acts on the valve body 27 in the opposite direction that opens the fuel passage. In this state, the force acting in the closing direction is much greater than the force acting in the opening direction. Therefore, the rubber seal 38 of the pilot valve 28 contacts the valve seat 43 of the center valve 29 and closes the first orifice 42. The rubber seal 41 of the center valve 29 contacts the valve seat 47 of the main valve 30 and closes the second orifice 46. The rubber seal 45 of the main valve 30 contacts the inner end surface 21a of the central bore 21 and closes the L-passage 23. Since the fuel passage is in a completely closed state, the pressurized fuel in the fuel tank 14 does not enter the fuel tube 14. In this state, the pilot valve 28 is separated from the stator 24. Furthermore, the coupling pin 31 is separated from the walls of the pin holes 39 and 44.

When electric current flows through the coil 52, an attraction force acts on the pilot valve 28 in a direction opening the fuel passage. The attraction force varies in accordance with the amount of the electric current flowing through the electromagnetic solenoid 53. If the force acting in the direction opening the fuel passage becomes stronger than the force acting in the direction closing the fuel passage, the pilot valve 28 and the coupling pin 31 are moved toward the stator 24 in the guide 19.

Figure 4:
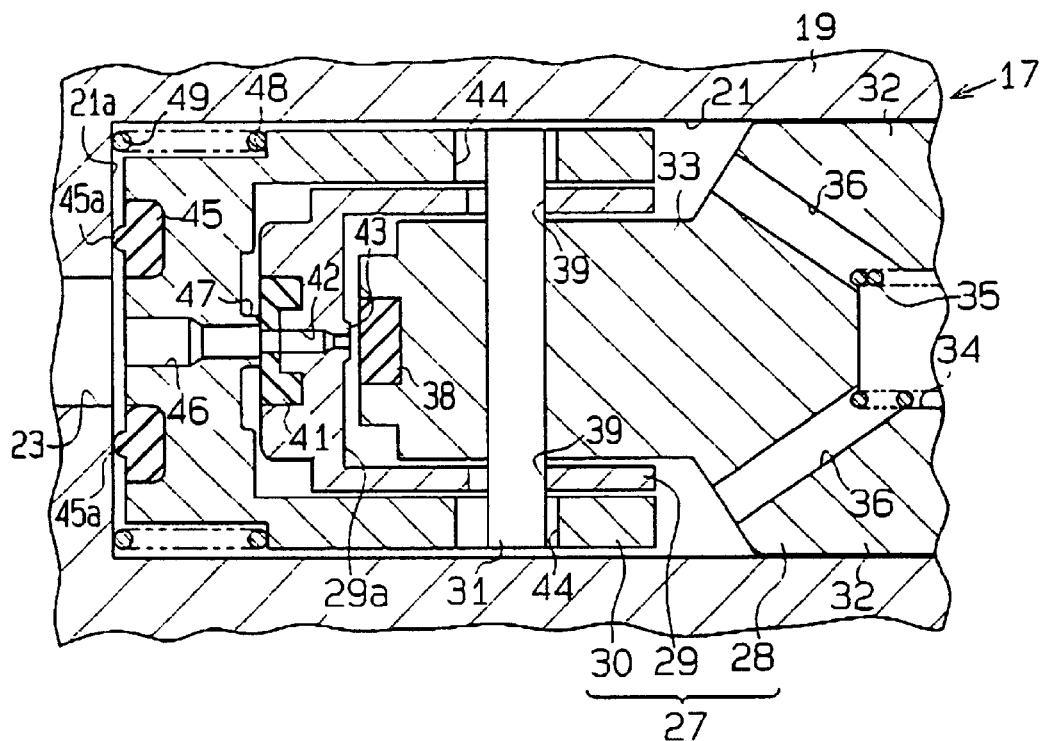
FIG. 4 is a partial enlarged cross-sectional view showing the flow amount control valve when the pilot valve starts to move.

If a relatively small amount of electric current flows through the coil 52, a rather weak force that pulls the pilot valve 28 toward the stator 24 (attraction force) is produced. Therefore, as indicated in FIG. 4, the pilot valve 28 and the coupling pin 31 are moved slightly. As shown in FIG. 4, the coupling pin 31 is moved slightly in the pin holes 39, 44. Thus, among the valve members constituting the valve body 27, only the pilot valve 28 moves in the direction that opens the fuel passage. The movement of the pilot valve 28 separates the rubber seal 38 from the valve seat 43 and opens the first orifice 42. The other valve members of the valve body 27, the center valve 29 and the main valve 30, remain at their original positions. In other words, the rubber seal 41 of the center valve 29 remains in contact with the main valve 30 and continuously closes the second orifice 46 while the rubber seal 45 of the main valve 30 remains in contact with the inner end surface 21a and continuously closes the L-passage 23.

A pressure difference Pd exists between the fuel pressure in the fuel tank 12 (tank pressure=P1) and the fuel pressure in the fuel tube 14 (tube pressure=P2). Thus, when the pilot valve 28 moves, the pressure difference Pd (Pd=P1−P2) draws the fuel in the fuel tank 12 toward the fuel tube 14 through the conduit 26, the spring bore 34, the diagonal passages 36, the gap between the small diameter portion 33 and the center valve 29, the orifices 42, 46, the L-passage 23, and the port 22. The flow of fuel is restricted by the first orifice 42, the cross-sectional area S1 of which is small.

Figure 5:
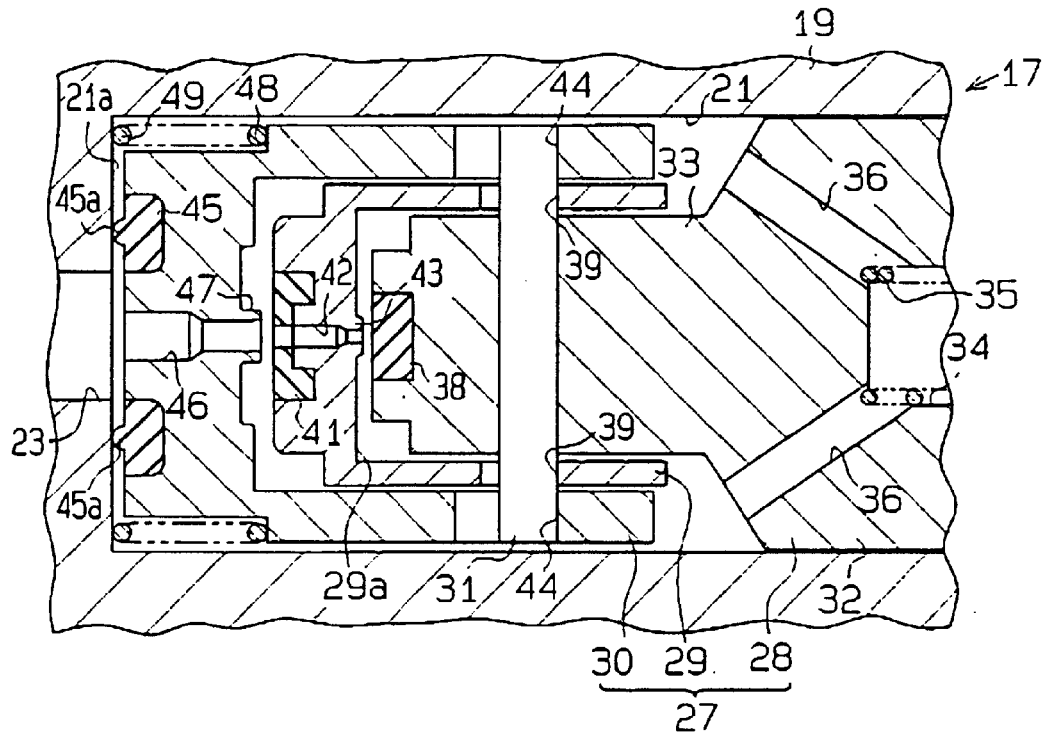
FIG. 5 is a partial enlarged cross-sectional view showing the flow amount control valve when the center valve starts to move.

If the amount of electric current flowing through the electromagnetic solenoid 53 is increased, the attractive force of the solenoid 53 is further increased. That is, the pilot valve 28 and the coupling pin 31 are moved by a greater force and thus a faster speed. When the coupling pin 31 contacts the walls of the pin holes 39, the coupling pin 31 connects the pilot valve 28 and the center valve 29. As shown in FIG. 5, the center valve 29 opens the fuel passage as it follows the movement of the pilot valve 28. The movement of the center valve 29 separates the rubber seal 41 from the valve seat 47 and opens the second orifice 46.

In this state (FIG. 5), the main valve 30 remains at its original position. The coupling pin 31 is just in contact or just about to contact the wall of the pin holes 44. The fuel pressure in the central bore 21 acting on the main valve 30 and the initial resistance to movement of the main valve 30 causes the rubber seal 45 of the main valve 30 to remain in contact with the end surface 21a and to close the L-passage 23. Furthermore, the rubber seal 38 of the pilot valve 28 remains separated from the valve seat 43 to keep the first orifice 42 open. The movement of the center valve 29 causes the pressure difference Pd to draw the fuel in the fuel tank 12 toward the fuel tube 14 through the conduit 26, the spring bore 34, the diagonal passages 36, the gap between the center valve 29 and the main valve 30, the second orifice 46, the L-passage 23, and the port 22. The flow rate of the fuel is restricted by the second orifice 46, the cross-sectional area S2 of which is greater than that of the first orifice 42. This draws a greater amount of fuel into the fuel tube 14 from the fuel tank 12 in comparison with the state of FIG. 4.

If the amount of the electric current flowing through the electromagnetic solenoid is further increased, the attractive force increases and further moves the pilot valve 28 and the coupling pin 31. The coupling pin 31 contacts not only the walls of the pin holes 39, but also the walls of the pin holes 44. Thus, the coupling pin 31 connects the pilot valve 28, the center valve 29, and the main valve 30 to one another. In this state, the main valve 30 follows the movement of the center valve 29 and the pilot valve 28 and opens the fuel passage to the fullest extent.

Figure 6:
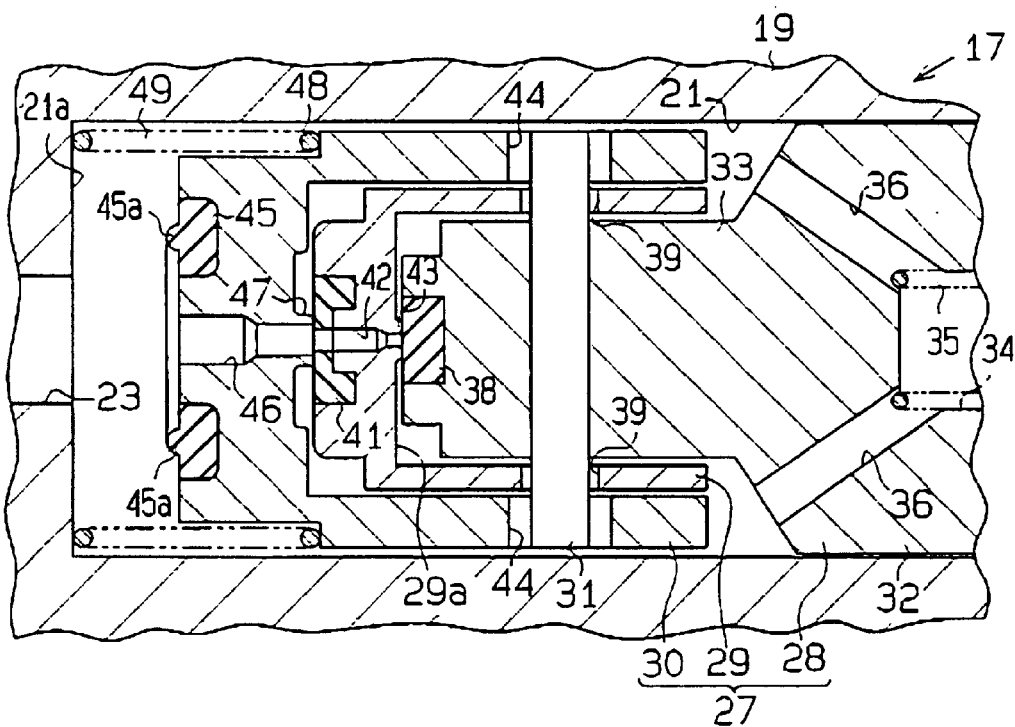
FIG. 6 is a partial enlarged cross-sectional view showing the flow amount control valve in a completely opened state.

The movement of the main valve 30 separates the rubber seal 45 from the end surface 21a and opens the L-passage 23, as shown in FIG. 6. The spring 49 then urges the main valve 30 and the center valve 29 toward the pilot valve 28 and separates the walls of the pin holes 44 and the pin holes 39 from the coupling pin 31. As a result, the main valve 30 completely opens the fuel passage. This results in the fuel difference Pd causing the fuel in the fuel tank 12 to be drawn into the fuel tube 14 through the conduit 26, the spring bore 34, the diagonal passages 36, the gap between the wall of the central bore 21 and the main valve 30, the L-passage 23, and the port 22. The flow amount of the fuel is restricted by the L-passage 23, the cross-sectional area S3 of which is greater than that of the second orifice 42. This draws in a greater amount of fuel into the fuel tube 14 from the fuel tank 12 in comparison with the states of FIGS. 4 and 5.

In each of the above three states, a greater amount of fuel flows through the flow amount control valve 17 as the tank pressure P1 becomes higher than the tube pressure P2, or as the difference between the tank pressure P1 and the tube pressure P2 increases.

In the flow amount control valve 17, an increase of the amount of electric current flowing through the electromagnetic solenoid 53 increases the attractive force. This, in turn, increases the moving distance of the pilot valve 28. The movement of the pilot valve 28 first opens the first orifice 42, then moves the center valve 29 in a slightly delayed manner to open the second orifice 46, and finally moves the main valve 30 in a further delayed manner to open the L-passage 23. As the orifices 42 and 46 are opened, the cross-sectional area of the fuel passage becomes larger. Thus, the amount of fuel flowing through the fuel passage increases in a three-step manner.

As shown in FIG. 1, the CNG vehicle is provided with a warning lamp 59, which is lit to indicate malfunctions of the fuel supply system. A fuel meter 60, an acceleration pedal depression degree sensor 61, an engine speed sensor 62, a first pressure sensor 63, a second pressure sensor 64, and a temperature sensor 65 are also provided to detect the conditions of various parts of the CNG vehicle.

The acceleration pedal depression degree sensor 61 detects the acceleration pedal depression degree A, which represents the degree that the acceleration pedal 13 is depressed by the driver. The engine speed sensor 62 detects the rotations of the crankshaft per unit time, or the engine speed R. The first pressure sensor 63 is incorporated in the housing 18 of the flow amount control valve 17, as shown in FIG. 2, to detect the tank pressure P1. The second pressure sensor 64 is provided in the fuel tube 14 to detect the tube pressure P2. The temperature sensor 65 is provided on the fuel tank 12 to detect the temperature of the fuel in the fuel tank 12, or the fuel temperature T. The fuel meter 60 measures the amount of fuel in the fuel tank 12 based on the tank pressure P1, which is detected by the first pressure sensor 63, and the fuel temperature T, which is detected by the temperature sensor 65.

The sensors 61–65, the warning lamp 59, and the electromagnetic solenoid 53 are connected to an electronic control unit (ECU) 66, which serves as an electric current flow control means. The ECU 66 carries out computations based on the detection signals sent from the sensors 61–65. The ECU 66 then controls the warning lamp 59 and the electromagnetic solenoid 53 based on the computation results. The ECU 66 includes a central processing unit (CPU) 67, a read only memory (ROM) 68, a random access memory (RAM) 69, a backup RAM 70, an input port 71, and an output port 72.

The CPU 67, the ROM 68, the RAM 69, the backup RAM 70, the input port 71, and the output port 72 are connected to each other by a bus 73. The ROM 68 stores programs and initial data to control the electric current that flows through the electromagnetic solenoid 53. The CPU 67 performs various computations based on the stored programs and data. The backup RAM 70 incorporates a battery (not shown) to keep the data stored in the RAM 69 when the ECU 66 is deactivated.

Figure 7:
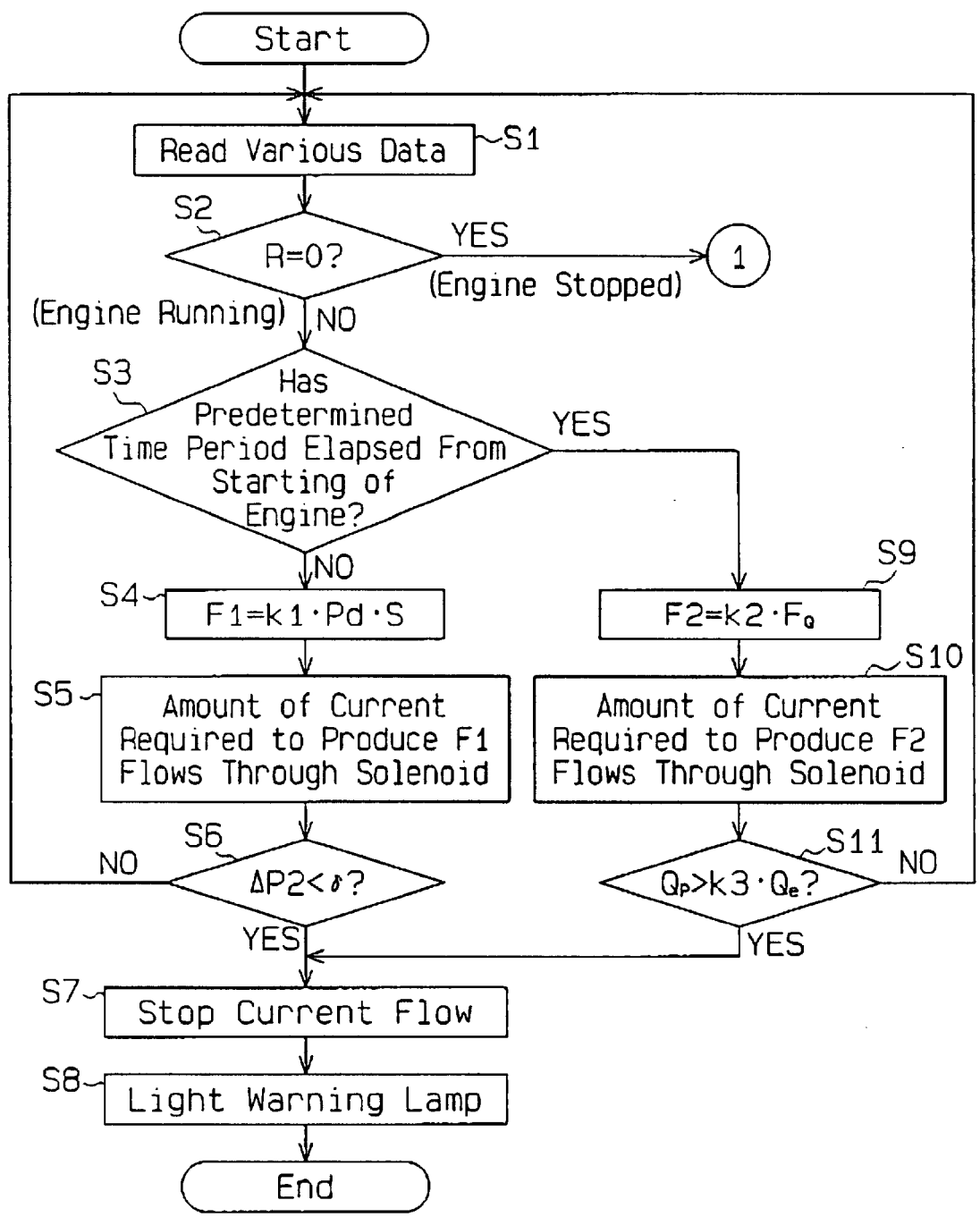
FIG. 7 is a flowchart showing a control program.
Figure 8:
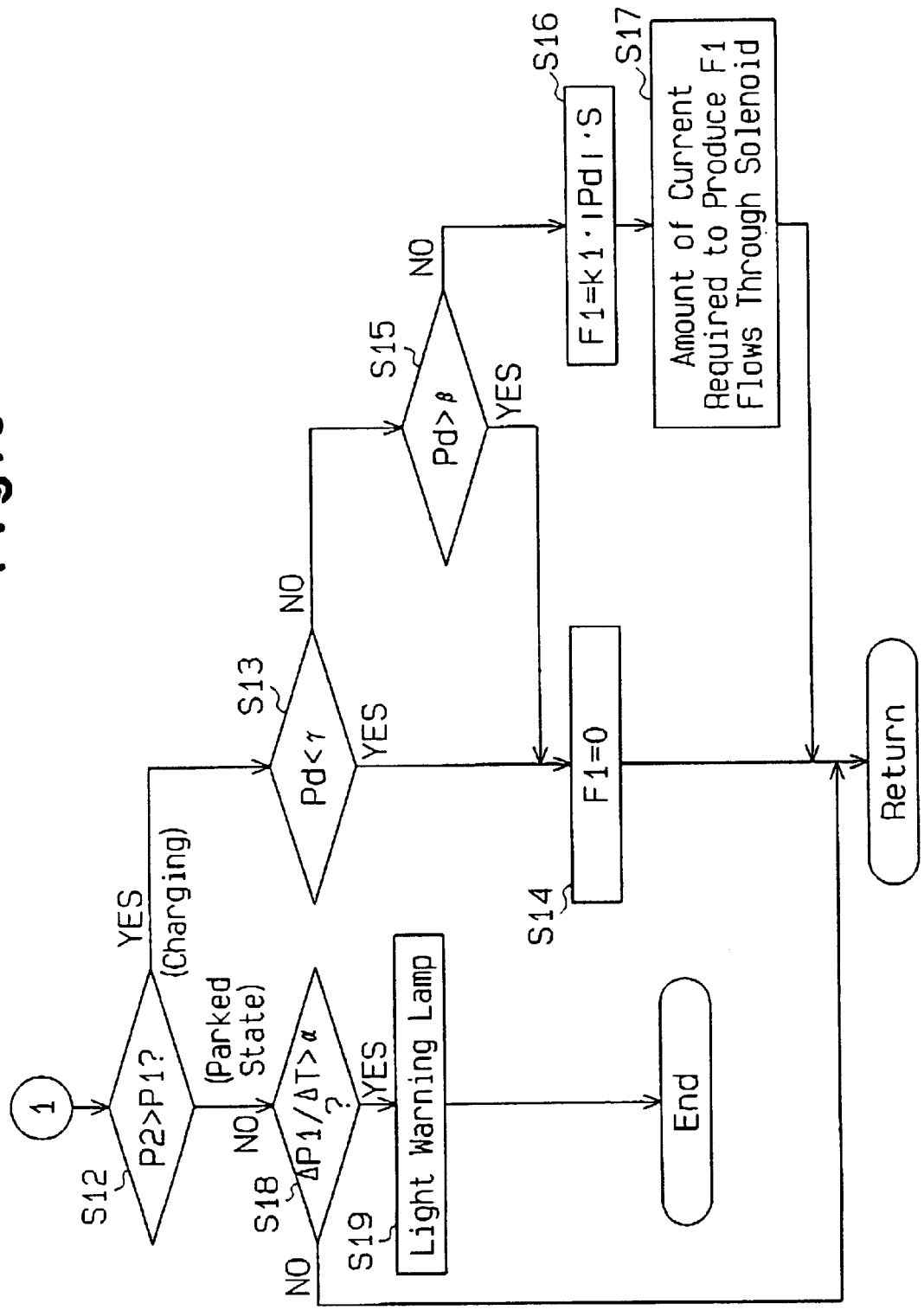
FIG. 8 is a flowchart showing part of the control program of FIG. 7.

FIGS. 7 and 8 show a flowchart of a routine executed by the CPU 67 to control the electric current that flows through the electromagnetic solenoid 53. The routine is executed in a cyclic manner at predetermined intervals.

When entering the routine, the CPU 67 first carries out step S1 and reads various data, such as the engine speed R detected by the engine speed sensor 62, the tank pressure P1 detected by the first pressure sensor 63, the tube pressure P2 detected by the second pressure sensor 64, and the temperature T detected by the temperature sensor 65.

At step S2, the CPU 67 judges whether or not the engine speed R is zero. If this condition is satisfied (R=0), the engine 11 is not running. In this case, the CPU 67 proceeds to step S12 (FIG. 8). When it is determined that the engine 11 is running (R≠0), the CPU 67 proceeds to step S3.

At step S3, the CPU 67 determines whether or not a predetermined time period (e.g., 20 seconds) has elapsed since the starting of the engine 11. If it is determined that the predetermined time period has not yet elapsed, the CPU 67 proceeds to step S4 and computes drive force F1 from equation (1), which is described below. The drive force F1 (valve opening force) refers to the force that is required to open the flow amount control valve 17.

$$F1 = k1 \cdot Pd \cdot S \tag{1}$$

In equation (1), k1 represents a coefficient that is greater than one. An increase in the value of k1 increases the drive force (valve opening force) F1. A larger drive force F1 shortens the total time during which the valve body 27 (the pilot valve 28, the center valve 29, and the main valve 30) opens the fuel passage. To obtain a greater drive force F1, a larger amount of electric current is necessary. A larger amount of current would increase the heat produced by the electromagnetic solenoid 53. Accordingly, the coefficient k1 is set optimally at a value that results in a short valve opening time while producing a relatively small amount of heat. In the equation, Pd represents the difference (P1–P2) between the tank pressure P1 and the tube pressure P2. Furthermore, S represents the pressure difference receiving area of the pilot valve 28 (the area to which the pressure difference of the fuel is applied). Under the same conditions (same fuel amount and temperature in the fuel tank 12), the valve opening force F1 is determined by the pressure difference between the fuel tank 12 and the fuel tube 14 and the pressure difference receiving area S of the flow amount control valve 17. The area S is equal to the cross-sectional area S1 of the orifice 42.

After carrying out step 54, the CPU 67 proceeds to step S5 and actuates the electromagnetic solenoid 53 with an amount of current that is required to produce the drive force F in the valve body 27. At step S6, the CPU 67 compares the fluctuation ΔP2 per unit time of the pressure in the fuel tube 14, which is detected by the second pressure sensor 64, with a reference pressure δ (e.g., minus three atm). If the fluctuation ΔP2 is lower than the reference pressure δ, the CPU 67 stops the flow of electric current to the electromagnetic solenoid 53 (step S7) and then lights the warning lamp 59 to indicate an abnormality (step 58).

In step S3, if it is determined that the predetermined time has elapsed, the CPU 67 proceeds to step S9 and computes the drive force F2. The drive force F2 (sustaining force) refers to the force that is necessary to sustain the flow amount control valve 17 in an opened state.

$$F2 = k2 \cdot F_Q \tag{2}$$

In equation (2), FQ represents the flow resistance, or the resistance force produced when the fuel from the fuel tank 12 flows past the valves 28, 29, 30 of the valve body 27. The flow resistance Fg is determined by the flow amount Qp. The flow amount $Q_p$ represents the amount of pressurized fuel supplied to the engine 11 from the fuel tank 12 by way of the fuel tube 14. The flow amount $Q_p$ correlates with the pressure difference Pd, the tank pressure P1, and the fuel temperature T in the fuel tank 12.

In equation (1), k2 represents a coefficient that is greater than one. The coefficient k2 may actually be affected by fluctuation factors that are unpredictable. Thus, although it is required that the coefficient k2 be a value greater than one, it is preferable that the coefficient k2 include a certain margin to offset the unpredictable factors. Furthermore, without the margin, the valve may function erroneously. Erroneous functioning refers to a state in which the drive force (sustaining force) F2 is insufficient and thus causes the valve body 27 to close after the predetermined time elapses from the starting of the engine. Accordingly, erroneous malfunctioning may be suppressed by setting the coefficient k2 at a value that is as large as possible. However, since the drive force (sustaining force) F2 increases as the coefficient increases, a large amount of electric current flow would be required to obtain the force F2. This would increase the heat produced by the electromagnetic solenoid 53. Furthermore, the flow amount control valve 17 is closed when the tank discharging resistance (the force applied to the valve body 27 when fuel flows out of the fuel tank 12) becomes greater than the drive force (sustaining force) F2 during an abnormality. Therefore, if the drive force (sustaining force) F2 is set at a large value, the flow amount control valve 17 remains opened until the tank discharge resistance increases to an undesirable value. That is, the closing of the valve is delayed during abnormalities. Thus, the coefficient k2 is set at a value that suppresses erroneous functioning and suppresses the generation of heat while preventing delayed responses during abnormalities.

After performing step S9, the CPU 67 proceeds to step S10 and actuates the electromagnetic solenoid 53 with the required amount of electric current to produce the drive force F2 on the valve body 27. At step S11, the CPU 67 compares the flow amount $Q_p$ from the fuel tank 12 with $k3 \cdot Q_e$. The flow amount $Q_p$ is computed from the tank pressure P1 detected by the first pressure sensor 63, the engine speed R detected by the engine speed sensor 62, the acceleration pedal depression degree A detected by the acceleration depression degree sensor 61, and the fuel temperature T in the fuel tank 12 detected by the temperature sensor 65. In the inequality of step S11, k3 represents a coefficient that is one or greater and that is obtained in the same manner as coefficient k2. Furthermore, Qe represents the average fuel flow supplied to the engine 11 over a certain length of time (e.g., 10 seconds). The average fuel flow amount $Q_e$ is computed through predetermined equations based on the tank pressure P2 detected by the second pressure sensor 64, the engine speed R detected by the engine speed sensor 62, the acceleration pedal depression degree A detected by the acceleration depression degree sensor 61, and the fuel temperature T in the fuel tank 12 detected by the temperature sensor 65. If the flow amount $Q_p$ exceeds $k3 \cdot Q_e$, the CPU 67 stops the flow of current to the electromagnetic solenoid 53 (step 57) and lights the warning lamp 59 (step 58).

If the condition of step S2 is satisfied (R=0), the CPU 67 determines that the engine 11 is not running and proceeds to step S12 (FIG. 8). At step S12, the CPU 67 judges whether or not the tube pressure P2 is greater than the tank pressure P1. If the condition of step S12 is satisfied (P2>P1), the CPU 67 determines that fuel is being charged into the fuel tank 12. The CPU 67 then carries out steps S13 to S19 in accordance with the progress of charging the fuel to control the flow amount control valve 17.

The flow amount control valve 17 is closed during the charging of fuel, and the valve body 27 is urged to a direction closing the fuel passage by the gas pressure in the tank 12 and the force difference between the spring 49 and the spring 35. The pulsations produced by the charging of fuel may vibrate the valve body 27. To prevent such vibrations, the valve body 27 could be opened. However, the flow amount control valve 17 must be closed when starting and when ending the charging of fuel. Thus, at step S13, the CPU 67 determines whether the pressure difference Pd is smaller than a reference pressure γ (e.g., minus 20 atm). If the condition is satisfied (Pd<γ), the CPU 67 determines that the charging of fuel is to be started and that the force on the valve body 27 due to the pressure difference Pd is much greater than the force on the valve body 27 caused by the pulsation. In this case, the CPU 67 proceeds to step S14. At step 514, the CPU 67 sets the drive force F1 to zero. The CPU 67 then returns to step 31.

If the condition of step S13 is not satisfied (Pd≧γ), the CPU 67 determines that the valve body 27 may vibrate and proceeds to step S15. At step S15, the CPU 67 judges whether or not the pressure difference Pd is greater than a reference pressure β (e.g., minus six atm). If this condition is not satisfied (Pd≦β), the CPU 67 determines that further time is necessary to complete the charging of fuel. In this case, the CPU 67 proceeds to step S16 and opens the flow amount control valve 17 to prevent vibrations. At step S16, the CPU 67 computes the drive force F1 from the equation (1) and then proceeds to step S17. At step S17, the CPU 67 actuates the electromagnetic solenoid 53 with an amount of electric current required to produce the drive force F1, which has been computed in step S16. After carrying out step S17, the CPU 67 returns to step Si.

If the condition of step S15 is satisfied (Pd>β), the CPU 67 determines that the time for finishing the charging of fuel is approaching. In this case, the CPU 67 proceeds to step S14 and sets the drive force F1 to zero. The CPU 67 then returns to step S1.

If the condition of step S12 is not satisfied (P2≦P1), the CPU 67 determines that the vehicle is not traveling and that fuel is not being charged. In this case, the CPU 67 proceeds to step S18 and monitors decreases in the fuel amount caused by leakage. To judge whether there is a leak, the fuel pressure is normally referred to in an approximate manner. The temperature and the pressure of the gas are substantially proportional to each other (strictly speaking, proportional if the gas is in an ideal state). Accordingly, if the value obtained by dividing the pressure fluctuation ΔP1 with the temperature fluctuation ΔT is constant, the CPU 67 determines that there is no fuel leakage. Thus, at step S18, the CPU judges whether or not (ΔP1/ΔT) is greater than a reference value a (e.g., 10%). The reference value α is set at 10% to avoid erroneous judgements since the fuel may not strictly be in the ideal state.

If the condition of step S18 is satisfied (ΔP1/ΔT>α), the CPU 67 determines that the fuel is decreasing and lights the warning lamp 59 (step S19). The CPU 67 then terminates this routine. If the condition of step S18 is not satisfied (ΔP1/ΔT≦α), the CPU 67 immediately terminates this routine.

The advantages of the first embodiment will now be described.

The electric current flowing through the electromagnetic solenoid 53 is controlled in accordance with the difference between the tank pressure P1 detected by the first pressure sensor 63 and the tube pressure P2 detected by the second pressure sensor 64. The electromagnetic solenoid 53 is controlled so that the attractive force of the solenoid 53 is slightly stronger than the sum of the urging force of the coil spring 35 and the force resulting from the pressure difference on the pilot valve 28. Thus, the fuel passage is opened by the valve body 27 with a minimum amount of current flowing through the electromagnetic solenoid 53. In the same manner, the fuel passage remains continuously opened by the valve body 27 with a minimum amount of current flowing through the electromagnetic solenoid 53.

In this manner, the electromagnetic solenoid 53 is actuated with the pressure difference between the outside and the inside of the fuel tank 12 taken into consideration. Thus, the fuel rate control valve 17 may be opened or sustained in the opened state by without consuming unnecessary electric current. The actuation of the electromagnetic solenoid 53 in this economic manner limits heating of the solenoid S3. This prevents deterioration of the rubber seals 38, 41, 45 that results from excessive heat.

The cross-sectional area of the fuel passage is changed in steps (three steps) in the flow amount control valve 17. Thus, the flow amount control valve 17 responds better in comparison with flow amount control valves that maintain the same cross-sectional area or those that change the cross-sectional area in a two step manner. Also, a very compact electromagnetic solenoid can be used. Thus, the flow amount control valve 17 reduces electric power consumption and heat generation.

The main valve 30 is fitted to the center valve 29, which is fitted to the small diameter portion 33 of the pilot valve 28. These three valves 28, 29, 30 are connected together by a single coupling pin 31 to constitute the three-step flow amount control valve 17. Thus, the flow amount control valve 17 has a simple structure.

When charging the fuel tank 12 with fuel, the fuel rate control valve 17 is not opened when starting and ending the charging of fuel and is opened during other periods. This prevents the valve body 27 from vibrating when performing fuel charging, except when starting or ending fuel charging. Thus, unnecessary actions of the valve body 27 are eliminated. This extends the life of the valve body 27 and the rubber seals 38, 41, and 45.

Figure 14:
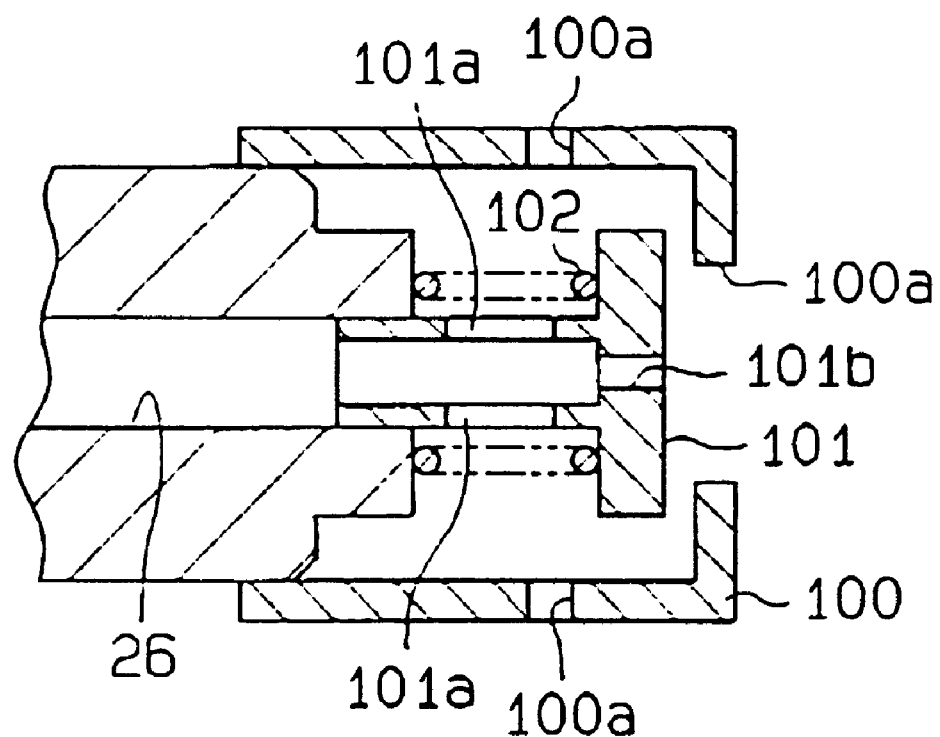
FIG. 14 is a partial cross-sectional view showing a prior art leakage prevention valve.

In the prior art, a mechanical leakage prevention valve is attached to the flow amount control valve 17, as shown by FIG. 14. In the embodiment of FIG. 2, when the force produced by the difference between the pressure in the fuel tank 12 and the pressure in the fuel tube 14 exceeds the sum of the urging force of the coil spring 49 and the electromagnetic force, the flow amount control valve 17 is completely closed. In other words, the flow amount control valve 17 incorporates the leakage prevention function. Thus, a mechanical leakage prevention valve such as that employed in the prior art need not be used. This simplifies the fuel supply system of the CNG vehicle.

If the force produced by the difference between the pressure in the fuel tank 12 and the pressure in the fuel tube 14 exceeds the sum of the urging force of the coil spring 49 and the electromagnetic force and thus completely closes the electromagnetic valve 17, the pressure difference further increases, in comparison to before the complete closure of the electromagnetic valve 17. If the increase in the pressure difference exceeds a predetermined value, the electromagnetic solenoid 53 may optionally be de-actuated. This would prevent the consumption of unnecessary electric power. As another option, the electromagnetic solenoid 53 may be de-actuated after complete closure of the flow amount control valve 17 when the supply of fuel to the engine 11 is stopped or when the engine speed is zero.

The employment of a pressure increasing apparatus, such as a compressor, to charge fuel may cause vibrations of the valve body 27. However, in this embodiment, the fuel rate control valve 17 is automatically opened when charging the fuel tank 12 with fuel (the state in which the tube pressure P2 is higher than the tank pressure P1). This reduces the vibration of the valve body 27 when charging fuel and reduces wear on the rubber seals.

In the prior art, it is recommended that a circuit be provided to manually switch the electromagnetic valve to its open position during inspections of the fuel tube. However, when using this circuit, the electromagnetic valve must be manually switched open to prevent deterioration of the rubber seals when charging the fuel. This is inconvenient. In comparison with the flow amount control valve used in the prior art, the electronic control type flow amount control valve is more durable and does not need to be switched opened during fuel charging.

A flow amount control valve according to a further embodiment of the present invention will now be described with reference to FIG. 13. Parts that are like or identical to the corresponding parts of the first embodiments are denoted with the same reference numerals.

The end of the pilot valve 28 that faces toward the stator 24 has the shape of a truncated cone. A recess 124, the shape of which conforms with that of the truncated cone-like end of the pilot valve 28, is provided at the end of the stator 24 to receive the pilot valve 28. When the pilot valve 28 completely closes the fuel passage as shown in FIG. 13, a gap corresponding to the stroke of the large diameter portion 32 is provided between the stator 24 and the recess 124.

A stepped portion 134 is provided at the middle of the spring bore 34. The coil spring 35 is arranged between the stepped portion 134 and the recess 124. The large diameter portion 32 includes a plurality of radial passages 136 that connect the space encompassing the small diameter portion 33 with the spring bore 34. Each radial passage 136 extends radially in a direction perpendicular to the coupling pin 31.

The center valve 29 has a plurality of first diagonal passages 129 that extend through the valve 29 diagonally from its inner end surface 29a. The inlet of each first diagonal passage 129 at the inner end surface 29a is located at the radially outer side of the rubber seal 38. The outlet of each first diagonal passage 129 at the outer end surface of the center valve 29 is located at the radially outer side of the rubber seal 41.

The main valve 30 has a plurality of second diagonal passages 130 that extend through the valve 29 diagonally from its inner end surface 30a. The inlet of each second diagonal passage 130 at the inner end surface 30a is located at the radially outer side of the rubber seal 41. The outlet of each second diagonal passage 130 at the outer end surface of the main valve 30 is located at the radially outer side of the rubber seal 45.

Figure 13:
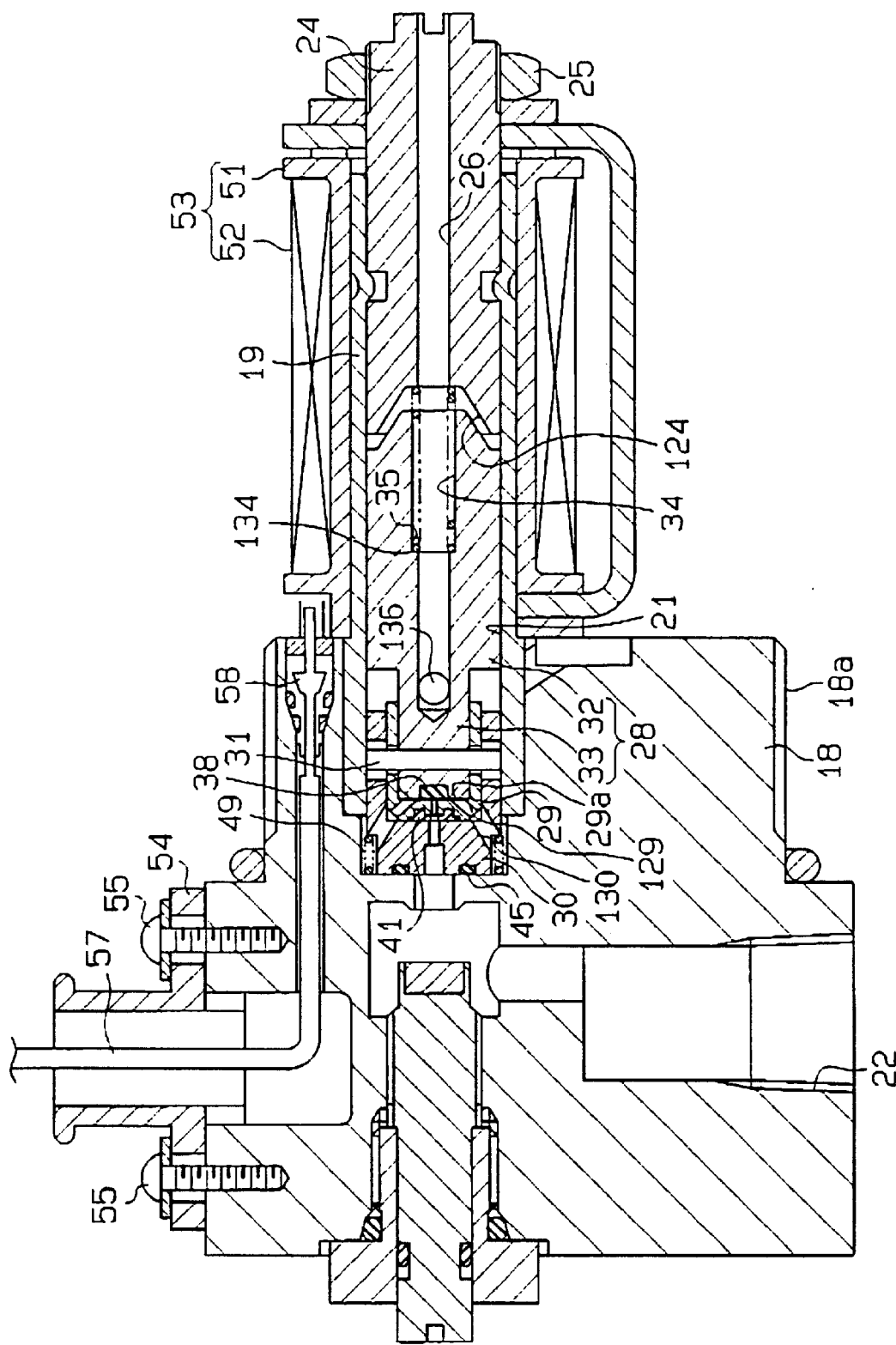
FIG. 13 is a cross-sectional view showing the flow amount control valve according to a further embodiment of the present invention.

As shown in FIG. 13, when the pilot valve 28 completely closes the fuel passage, the associated first and second diagonal passages 129, 130 are connected with each other. In this state, electric current flows through the coil 52 of the electromagnetic solenoid 53 to form a magnetic circuit between the stator 24 and the pilot valve 28. The electromagnetic force of the electromagnetic solenoid 53 attracts the pilot valve 28 toward the stator 24 and moves the pilot valve 28 toward the right, as viewed in FIG. 13. When the magnetic circuit is formed, the truncated cone at the end of the pilot valve 28 increases the area of the pilot valve 28 included in the magnetic circuit, in comparison with the first embodiment. The stroke of the pilot valve 28 is also decreased in comparison with that of the first embodiment. Accordingly, the amount of electric current that moves the pilot Valve 28 is decreased.

When the pilot valve 28 moves and separates its rubber seal 38 from the inner end surface 29a of the center valve 29, fuel passes through the conduit 26 and enters the central bore 21 through the radial passages 136. The fuel then flows through the gap between the pilot valve 28 and the center valve 29 and reaches the interior of the center valve 29. In this state, some of the fuel escapes out of the main valve 30 through the first and second diagonal passages 129, 130. This decreases the time to open the fuel passage in comparison with the first embodiment.

Figure 9:
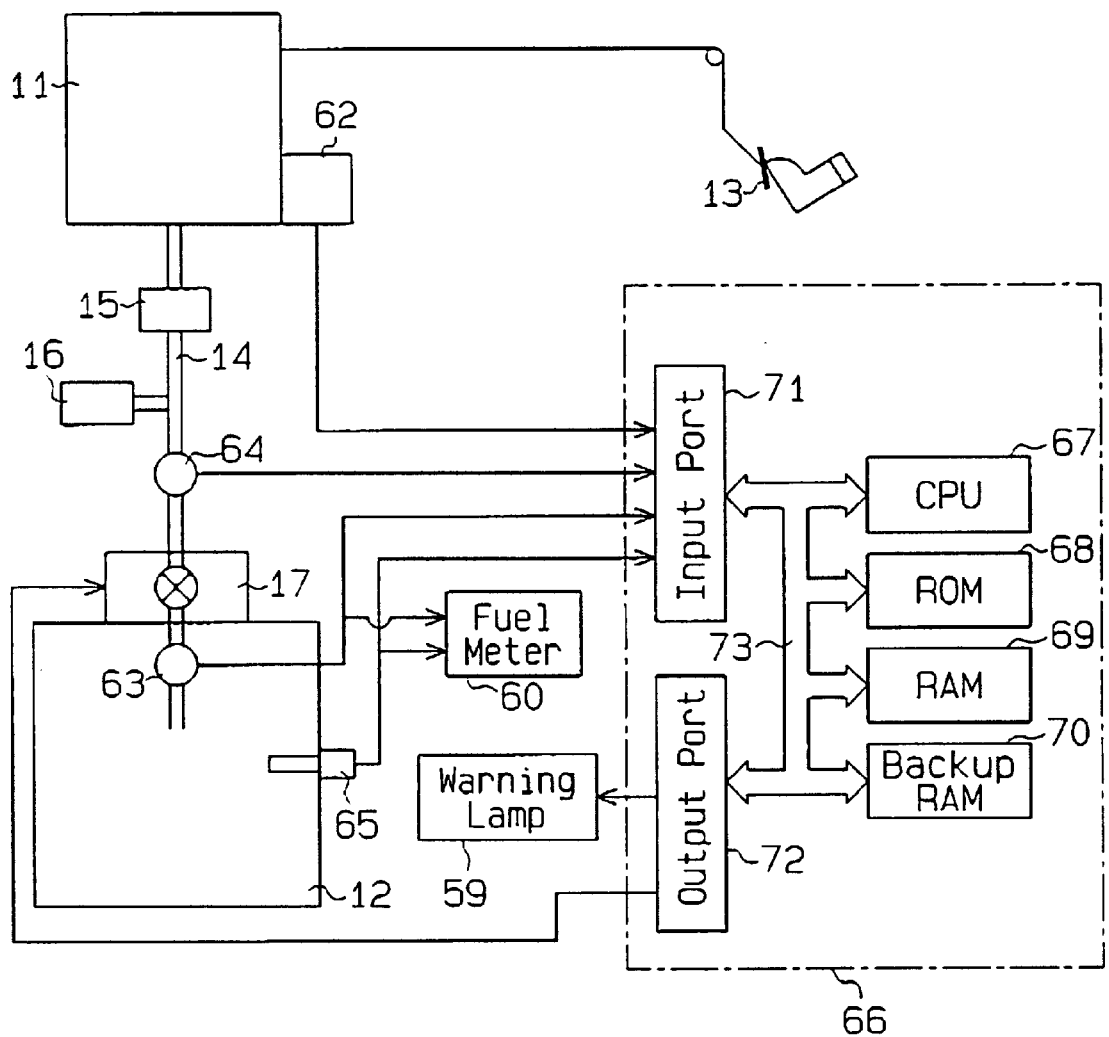
FIG. 9 is a block diagram showing a fuel supply controller according to a further embodiment of the present invention.
Figure 10:
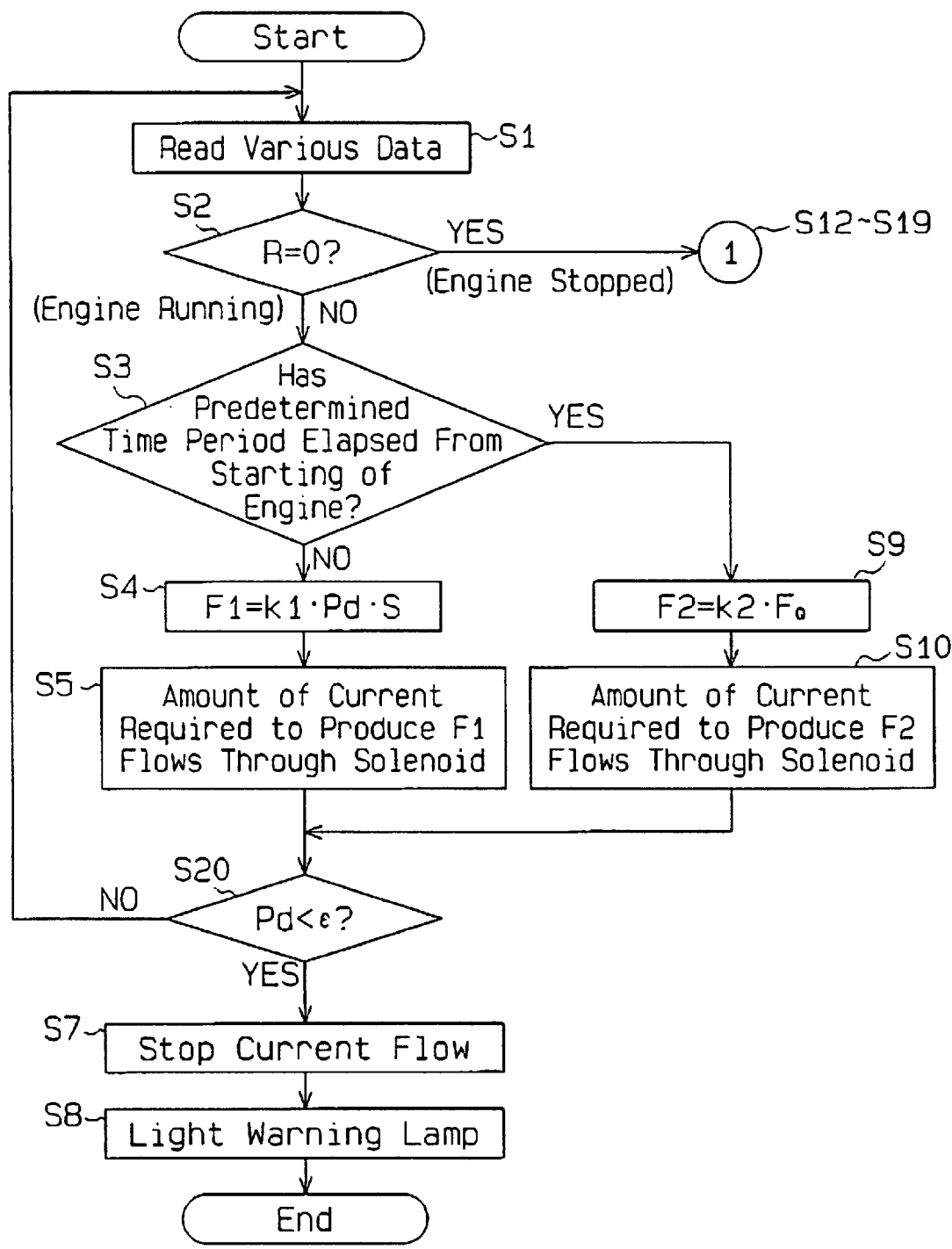
FIG. 10 is a flowchart showing the control program employed in the embodiment of FIG. 9.

A further embodiment according to the present invention will now be described with reference to FIGS. 9 and 10. Parts that are like or identical to the corresponding parts of the earlier embodiments are denoted with the same reference numerals. In the flowchart of FIG. 10, steps that are like or identical to the corresponding steps of the flowchart of FIG. 7 are denoted with the same reference numerals. In the flowchart of FIG. 10, the steps S12 to S19 subsequent to step S2 are identical to the steps denoted with the same reference numerals in the first embodiment. Thus, steps S12 to S19 are not shown in the flowchart of FIG. 10.

This embodiment does not employ the acceleration pedal depression degree sensor 61 employed in the first embodiment. In the first embodiment, step S11 is performed to determine whether there is an abnormality by referring to the average flow amount $Q_\epsilon$ and the acceleration pedal depression degree A. In this embodiment, step S11 is replaced by step 520 to determine whether there is an abnormality. In step S20, the pressure difference Pd is compared with a predetermined reference pressure $\epsilon$. Due to an abnormality, the pressure difference Pd may exceed the reference pressure $\epsilon$. When it is determined that the pressure difference Pd has exceeded the reference pressure $\epsilon$, the CPU 67 proceeds to steps S7 and SB.

In this embodiment, like the first embodiment, valve open control and valve vibration prevention control are executed in accordance with the detected pressure difference Pd. The advantages of the first embodiment also result in this embodiment.

Figure 11:
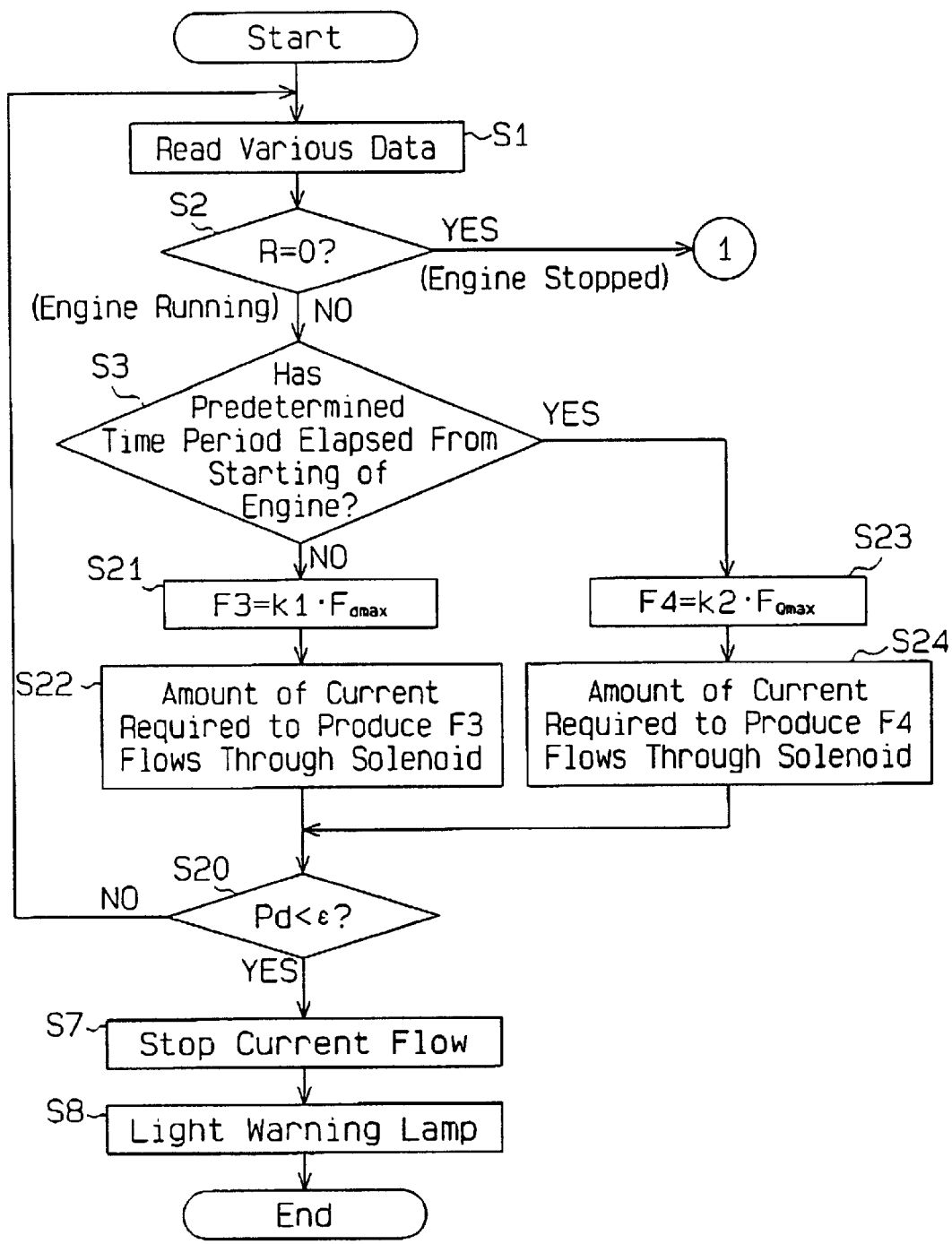
FIG. 11 is a flowchart of a control program employed in a further embodiment according to the present invention.
Figure 12:
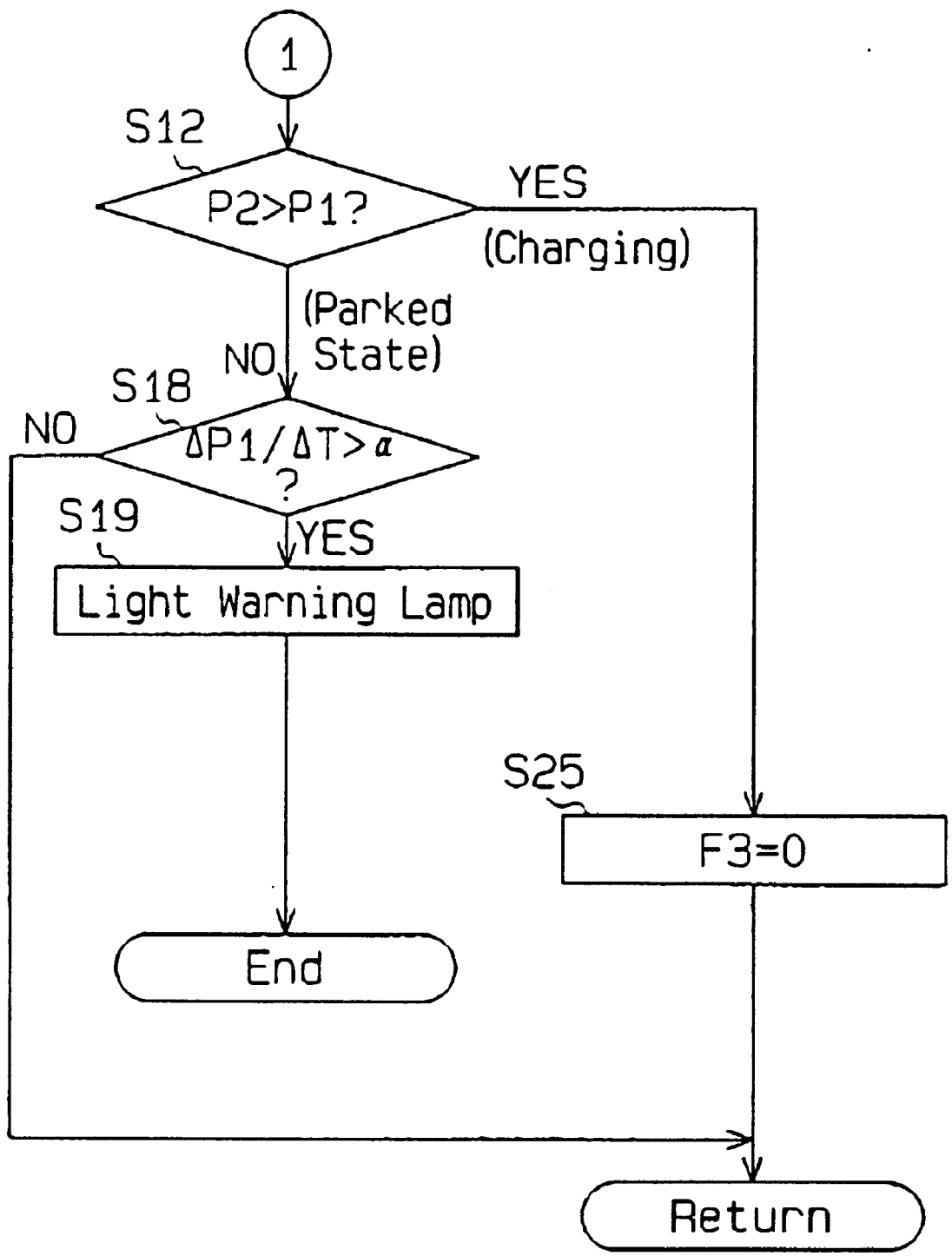
FIG. 12 is a flowchart showing part of the control program of FIG. 11.

A further embodiment according to the present invention will now be described with reference to FIGS. 11 and 12. The structure of the apparatus in this embodiment is the same as the structure of the apparatus of FIG. 9. In the flowchart of FIGS. 11 and 12, steps that are like or identical to the corresponding steps of the flowchart of FIG. 10 are denoted with the same reference numerals.

In this embodiment, if it is determined that the predetermined time has not yet elapsed since the starting of the engine 11 in step S3, the CPU 67 proceeds to step S21 and computes the drive force F3 from the following equation (3). The drive force F3 is the force required to open the flow amount control valve 17.

$$F3 = k1 \cdot F_{dmax} \qquad (3)$$

In equation (3), Fdmax represents the predicted maximum pressure difference between the tank pressure P1 and the tube pressure P2 in a normal state. The maximum pressure difference $F_{max}$ is obtained when the pressure in the fuel tube 14 is minimum, which occurs immediately after servicing the fuel supply system. After performing step S21, the CPU 67 proceeds to step S22 and actuates the electromagnetic solenoid 53 with an amount of electric current that is required to produce the drive force F3 in the valve body 27.

If it is determined that the predetermined time has elapsed in step S3, the CPU 67 proceeds to step S23 and computes the drive force F4 from the following equation (4). The drive force F4 is the force required to open the flow amount control valve 17.

$$F4 = k2 \cdot F_{Qmax} \qquad (4)$$

In equation (3), $F_{Qmax}$ represents the predicted maximum flow resistance force that is produced as the fuel flows out of the fuel tank 12 in a normal state. The maximum flow resistance force $F_{Qmax}$ is obtained when the engine speed becomes maximum.

From step S23, the CPU 67 proceeds to step S24 and actuates the electromagnetic solenoid 53 with an amount of electric current that is required to produce the drive force F4 in the valve body 27. As shown in FIG. 12, when charging fuel, the drive force F3 is set at zero. In this embodiment, valve open control is performed based on the predicted maximum pressure difference to decrease the amount of electric current.

It should be apparent to those skilled in the art that the present invention may be embodied in many other specific forms without departing from the spirit or scope of the invention. Particularly, it should be understood that the invention may be embodied in the following forms.

(1) In the illustrated embodiments, the flow amount control valve is arranged in the fuel tank. However, the flow amount control valve may be arranged outside the fuel tank.

(2) In the illustrated embodiments, the valve body 27 consists of three valves; the pilot valve 28, the center valve 29, and the main valve 30. However, more than three valves may be used to constitute the valve body. This would change the effective opening of the fuel passage in more than three steps and would enable the cross-sectional area of the fuel passage to be varied in a finer manner.

(3) The pin holes 39, 44 may be round holes or elongated holes.

(4) The size of the pin holes 39, 44 may be altered arbitrarily to change the timing for starting the movement of the center and main valves 29, 30 when opening the associated second orifice 46 or L-passage 23.

(5) The ECU employed in each of the above embodiments may be provided with a function that stops the electric current flowing through the electromagnetic valve when it is judged that the flow rate of fuel is too high or if the pressure difference between the fuel at the upstream side and downstream side of the electromagnetic valve exceeds a predetermined value.

(6) The flow amount $Q_p$ may be detected by the fuel meter 60.

(7) In the first embodiment, abnormalities are determined from the detected flow amount $Q_p$ and the detected average flow amount $Q_e$. If there is an abnormality, the flow of current to the electromagnetic valve is stopped. However, the predicted maximum average flow amount may be referred to instead of the average flow amount $Q_e$.

(8) If the engine is one in which fuel injection is controlled electronically, the amount of fuel sent to the engine may be computed from the fuel pressure applied to the fuel injection valve (substantially constant) and the time during which the injection valve is opened.

Therefore, the present examples and embodiments are to be considered as illustrative and not restrictive and the invention is not to be limited to the details given herein, but may be modified within the scope and equivalence of the appended claims.

What is claimed is:

1. A fuel supply apparatus for supplying a fuel from a fuel container to a destination, comprising:

a passage extending between the destination and the fuel container;

an electromagnetic valve for selectively closing and opening the passage, wherein the valve opens the passage when an electric current is supplied to the valve; and a controller for controlling the flow of electric current to the valve, wherein the controller receives information indicative of the amount of fuel exiting from the fuel container to control a valve opening force required to open the valve and a sustaining force necessary to sustain the valve in an opened state, the valve opening force and the sustaining force being produced by flowing the electric current to the valve.

2. The fuel supply apparatus according to claim 1, wherein the controller determines whether a malfunction regarding the fuel supply has occurred in response to the information.

3. The fuel supply apparatus according to claim 1, wherein the controller stops supplying the electric current flow to the valve when the controller determines that a malfunction has occurred.

4. The fuel supply apparatus according to claim 3, wherein the valve is closed according to the difference between the pressure at a location upstream of the valve and the pressure at a location downstream of the valve before the electric current to the valve is stopped.

5. The fuel supply apparatus according to claim 1 further comprising sensing means for detecting at least one physical characteristic relating to the amount of fuel exiting from the fuel container.

6. The fuel supply apparatus according to claim 5, wherein the sensing means includes a pressure sensor for sensing the pressure within the fuel container.

7. The fuel supply apparatus according to claim 5, wherein the sensing means includes a pressure sensor for sensing the pressure within the passage.

8. The fuel supply apparatus according to claim 5, wherein the sensing means includes:

a first detector for detecting the pressure within the fuel container; and a second detector for detecting the pressure within the passage, wherein the information is a signal representing the difference between the pressure within the container and that within the passage.

9. The fuel supply apparatus according to claim 5, wherein the sensing means includes a temperature sensor for sensing the temperature within the container and a pressure sensor for sensing the pressure within the container.

10. The fuel supply apparatus according to claim 5, wherein the apparatus is connected to a vehicle having an engine and an accelerator pedal, and wherein the sensing means includes a sensor for detecting the degree of depression of the accelerator pedal and a sensor for detecting the speed of the engine.

11. The fuel supply apparatus according to claim 1, wherein the information regarding the amount of the fuel exiting the container is a signal representing the difference between the pressure within the container and the pressure within the passage.

12. The fuel supply apparatus according to claim 1, wherein the valve includes:

a first movable valve component directly driven in response to the current supplied to the valve for opening a section of the passage that has a first cross sectional area;

a second movable valve component connected to the first valve component for opening a section of the passage that has a second cross sectional area; and a third movable valve component connected to the second valve component for opening a section of the passage that has a third cross section area; and a coupling device for connecting the first, second and third valve components together, wherein the coupling device provides a predetermined amount of slack to be taken up before the second and third valve components are engaged by the coupling device.

13. The fuel supply apparatus according to claim 12, wherein the coupling device is a pin, the axis of which is transverse to a direction of movement of the valve components.

14. The fuel supply apparatus according to claim 12, wherein the second cross sectional area is greater than the first cross sectional area, and wherein the third cross sectional area is greater than the second cross sectional area.

15. A method of controlling a fuel supply apparatus comprising:

selectively opening and closing a fuel passage with an electromagnetic valve, wherein the valve opens the passage when a current is supplied to the valve;

sensing information relating to the amount of fuel exiting a fuel container, wherein the fuel container supplies fuel to the valve; and controlling a current flow to the valve using the sensed information to regulate the flow of fuel exiting the fuel container by controlling a valve opening force required to open the valve and a sustaining force necessary to sustain the valve in an opened state, the valve opening force and the sustaining force being produced by current flowing to the valve.

16. The method of claim 15 further comprising:

determining whether a malfunction has occurred in the fuel passage based on the sensed information; and stopping the flow of current to the valve when it is determined that a malfunction has occurred.

17. The method of claim 15 further comprising:

sensing the pressure in the fuel container;

sensing the pressure in the passage; and using the sensed pressures to produce the information.

18. The method of claim 15 further comprising:

opening the valve in a plurality of stages according to the amount of current flowing to the valve.

19. The method of claim 15, further comprising:

sending a predetermined current to the valve during a time that the container is being charged with fuel to prevent vibration of the valve caused by the flow of fuel through the valve.

20. The method of claim 15, wherein the step of controlling the current flow to the valve comprises:

calculating the amount of force required to open the valve in accordance with the information;

determining a current amount to be sent to the valve to apply the calculated force to the valve; and sending the determined current to the valve.

* * * * *